United States Patent [19]
Burnitzki et al.

[11] Patent Number: 6,073,470
[45] Date of Patent: Jun. 13, 2000

[54] VEHICLE WHEEL LOCK DEVICE

[76] Inventors: Larry D. Burnitzki; Lorraine L. Burnitzki, both of 2191 W. Tomah, Porterville, Calif. 93257

[21] Appl. No.: 09/222,673

[22] Filed: Dec. 29, 1998

Related U.S. Application Data

[60] Provisional application No. 60/070,254, Dec. 31, 1997.
[51] Int. Cl.[7] .................................................. B60R 25/00
[52] U.S. Cl. ............................... 70/226; 70/225; 70/228; 70/237
[58] Field of Search .............................. 70/225, 226, 237, 70/228; 188/2 R

[56] References Cited

U.S. PATENT DOCUMENTS

| | | | |
|---|---|---|---|
| 2,960,857 | 11/1960 | Winter | 70/225 |
| 3,581,846 | 6/1971 | Janus | 188/32 |
| 3,695,071 | 10/1972 | West | 70/225 |
| 3,845,643 | 11/1974 | Barrett | 70/18 |
| 4,312,452 | 1/1982 | Waier | 211/23 |
| 4,804,070 | 2/1989 | Bohler | 188/32 |
| 4,977,974 | 12/1990 | Brown | 70/226 |
| 5,137,121 | 8/1992 | Leonard | 188/32 |
| 5,689,981 | 11/1997 | DeLuca et al. | 70/226 |
| 5,887,462 | 3/1999 | Stone | 70/19 |

*Primary Examiner*—B. Dayoan
*Assistant Examiner*—John B. Walsh
*Attorney, Agent, or Firm*—Richard A. Ryan

[57] ABSTRACT

A device for locking the wheel of a vehicle to prevent unauthorized movement of the vehicle. The device is particularly suited for use with trailers and other such vehicles that are often left at unguarded or remote locations. The device has a mounting member suitable for mounting on the underside of the vehicle frame or body and a locking member suitable for placement under one of the wheels of the vehicle. A connecting member interconnects and is hingedly connected to both the mounting and locking members. To allow use on a variety of vehicles, the connecting member is adjustable to vary its length and it adjustably connects to the mounting member. The hinged connections of the connecting member to the mounting and locking members allows the device to be placed in a collapsed configuration when it is not in use. A retaining pin is used to hold the device in the collapsed condition. When in the locked configuration, the device prevents rotation of one of the vehicle's wheels, preventing sustained movement of the vehicle.

18 Claims, 3 Drawing Sheets

VEHICLE WHEEL LOCK DEVICE

CROSS-REFERENCE TO RELATED APPLICATIONS

This application claims the benefit of U.S. Provisional Patent Application Ser. No. 60/070,254 filed Dec. 31, 1997.

BACKGROUND OF THE INVENTION

A. Field of the Invention

The field of the present invention relates generally to devices for securing a vehicle in place so as to prevent theft of the vehicle. More specifically, this invention relates to devices for securing vehicles, particularly trailers, by locking a wheel of the vehicle to prevent unauthorized movement of the vehicle. Even more specifically, this invention relates to theft deterrent devices used to secure a vehicle in place by preventing movement of one of the vehicle wheels.

B. Background

Unfortunately, vehicle theft is a common concern among most people today. As security devices become more complicated, it seems thieves become more sophisticated and more resourceful, making protection of one's vehicle difficult. Because cars, trucks and other motor vehicles require power control systems and steering mechanisms, it is generally easier to disable these types of vehicles than vehicles that rely on the movement of another vehicle for movement, such as trailers. Because trailers do not have power systems or steering mechanisms, they are more difficult to disable to prevent theft.

Many persons utilize trailers for various applications, including trailers for transporting vehicles and goods and as a camping trailer. When used to transport vehicles, such as race cars or show cars, or other expensive materials or goods, the trailers contain very valuable material, in addition to the value of the trailer itself. While utilizing a trailer, the driver often needs to disconnect the trailer from the vehicle towing the trailer and leave the trailer at a specified location. All too often, unfortunately, thieves utilize the opportunity of a trailer left at a location, particularly if it is remote, to steal the trailer and its contents. Once the trailer is removed from its stored location and taken to a "safe" location, the thieves are able to open the trailer and remove its contents. Due to the nature of the crime and the vehicles or goods stored therein, it is often difficult for the owner to regain possession of his or her property.

To prevent theft of a trailer left or stored at a protected or unprotected location, the trailer owner typically uses a lock on the tongue of the trailer to prevent hook-up with an unauthorized vehicle. Occasionally, the trailer owner locks the tongue to a fence, post or other relatively unmovable object. Unfortunately, sophisticated thieves have no difficulty in either unlocking the locks or, as more often the case, using bolt cutters or other devices to free the trailer from its locking system.

While no device can absolutely prevent theft of a vehicle or trailer in light of current technology and a determined thief, devices have been developed that, when properly used, deter the would be thief from stealing the vehicle, in part because of the amount of time and effort it takes to remove or get around the theft deterrent device. An example of devices that have been highly successful at accomplishing this objective are the various steering wheel lock devices that provide a bar across the steering wheel, making movement of the steering wheel, and hence the vehicle, virtually impossible.

While the steering wheel lock devices have worked well for vehicles such as automobiles and trucks, there exists a need for a device that is specifically designed to allow the owner of a trailer to leave his or her trailer in a designated location and prevent unauthorized movement of the trailer in order to protect the owner's investment in the trailer and the vehicles or goods stored therein. More specifically, there exists a need for a device that allows a trailer owner to quickly and securely lock his or her trailer in place in order to prevent unauthorized movement of the trailer.

SUMMARY OF THE INVENTION

The trailer wheel lock device of the present invention solves the problems identified above. Specifically, the present invention discloses a device for securely locking a vehicle in place by preventing rotational movement of one of the vehicle's wheels. The present invention deters theft of the vehicle by making sustained movement of the vehicle virtually impossible. The present invention is particularly suited for preventing theft of a trailer. Because most thieves are not so bold as to attempt to remove a trailer's contents at the location where the trailer was left or stored, the device of the present invention also provides protection for the contents of the trailer.

The device of the present invention comprises three primary components that, in use in its locking configuration, resemble a backwards "Z" shape. For purposes of illustration only, the description and use of the present invention are particularly described in relation to its use with a trailer, although it can be used with other types of vehicles. The top horizontal component is affixed to the trailer frame or body, the bottom horizontal component is suitable for being placed under the tire of the trailer and the diagonal component interconnects the two horizontal components. The diagonal component is of adjustable length to allow for trailers of varying heights above the ground and comprises a mechanism for locking the length of the component for a specific trailer height. In the preferred embodiment, the device is made of high strength metal having properties that make it suitable for connecting to a trailer and for preventing theft of the trailer (i.e., difficult to cut or break, resistant to corrosion, etc.).

The device of the present invention is affixed to and carried with the trailer in a collapsed configuration against the trailer frame or body when not in use. When the trailer owner desires to leave the trailer at a certain place, whether temporarily or relatively long term, the trailer owner merely unfolds the device, places the bottom horizontal component next to the trailer tire and locks the device into position by placing the trailer tire over the device. Once set, movement of the trailer is effectively prevented until the present invention is unlocked by the owner of the trailer.

Accordingly, the primary objective of the present invention is to provide a device that is easy for a vehicle owner to use, quick to lock and unlock, and yet suitable as a deterrent for unauthorized movement of a vehicle by preventing one of the vehicle's wheels from freely rotating.

It is also an important objective of the present invention to provide a device that utilizes a backwards "Z" shaped mechanism that is affixed to a vehicle frame or body which can be folded out of the way when not in use and unfolded and placed under one of the vehicle's wheels to prevent unauthorized movement of the vehicle.

It is also an important objective of the present invention to provide an adjustable vehicle wheel lock device that is suitable for use on a variety of vehicles that are at different heights above the ground.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiment of the present invention, designated generally as 10, is set forth below. As stated above, the description and use of the wheel lock device 10 is generally described in relation to its use on and with a trailer. However, it should be clear to the reader that the device 10 is not so limited, in that it can be utilized with a variety of vehicles, including cars, trucks and trailers.

Figure 1:
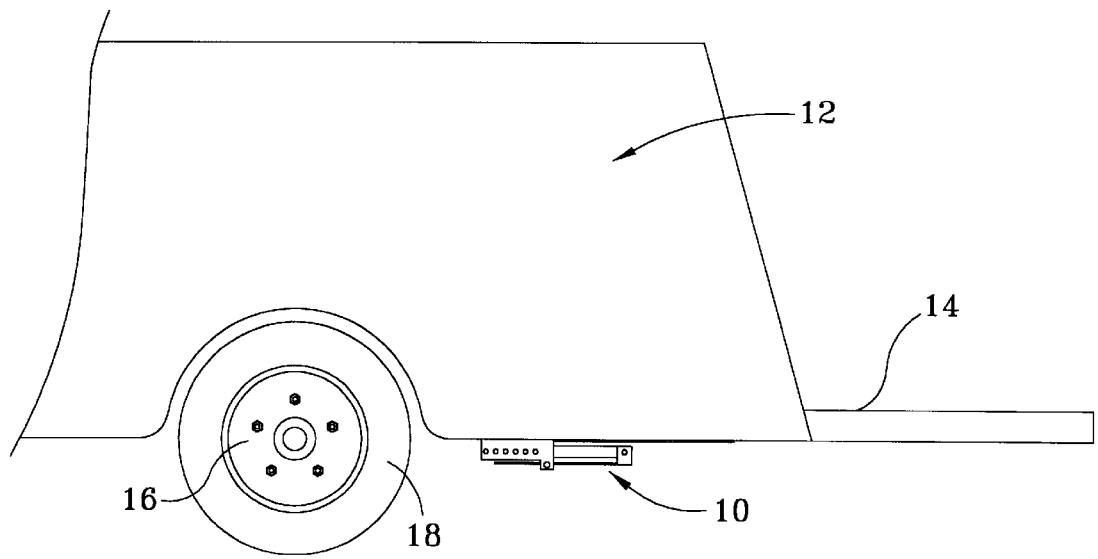
FIG. 1 is a side view of the device of the present invention in a collapsed configuration when mounted on a typical trailer.

The typical trailer, illustrated as 12 in FIG. 1, has tongue 14 that connects to a vehicle (not shown) to move the trailer from one location to another. The wheel lock device 10, shown in the folded or unlocked position in FIG. 1, should be located relatively near one of trailer wheels 16, on which is mounted tire 18. As shown in FIG. 1, device 10 can be located forward of front wheel 16 of trailer 12, between tongue 14 and tire 18. Although shown forward of front wheel 16, device 10 is also suitable for placement rearward of front wheel 16 or either forward or rearward of one of the rear wheels (not shown) of trailer 12. In general, the principal requirement for the placement of device 10 is that it be located near one of the wheels 16 on trailer 12 at a location where it can be fixedly mounted to the underside of the trailer's frame or body.

Figure 2:
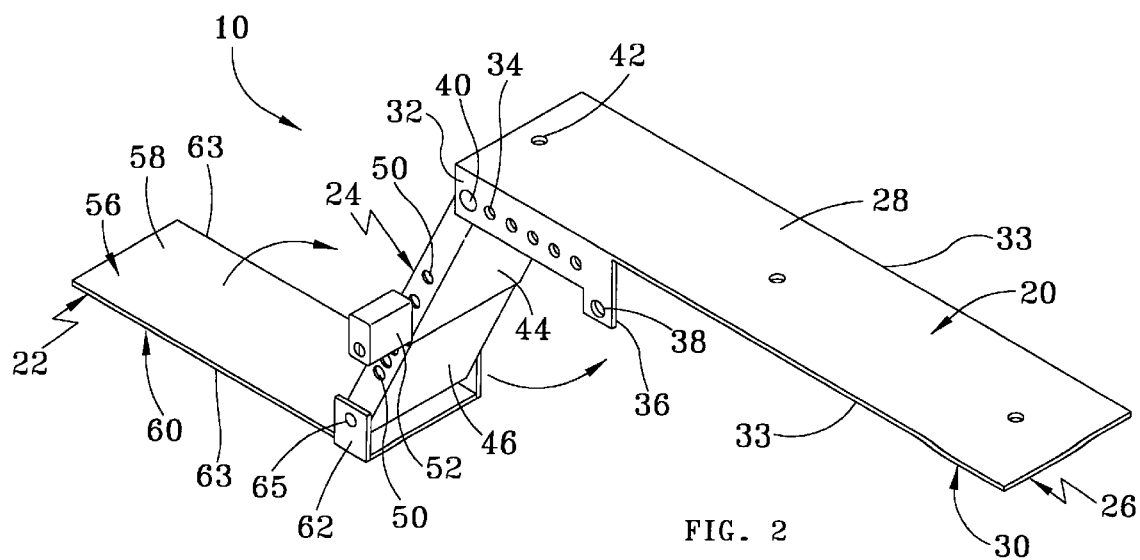
FIG. 2 is a perspective view illustrating the preferred embodiment of present invention.

Trailer wheel lock device 10 comprises three primary components, mounting member 20, locking member 22 and connecting member 24 that when connected together and in its locking configuration, as shown in FIG. 2, form a generally backward "Z" shaped device. In the preferred embodiment, mounting member 20 comprises a generally flat plate 26 having a top surface 28, bottom surface 30 and side members 32 on opposing sides 33 of flat plate 26. In the alternative, mounting member 20 can comprise a non-planar member. Side members 32 have a plurality of openings 34 that allow adjustment of device 10 for different trailers, so that locking member 22 can be placed under tire 18 for any size trailer. Alternatively, if the device 10 is to be sized for a specific trailer configuration, side members 32 can have only one opening 34 or connecting member 24 can be fixedly, yet pivotally, attached to mounting member 20. On downwardly extending portions 36 of side members 32 located at one end of side members 32 are located a pair of opposing pin openings 38 sized to removably receive retaining pin 39. As shown in FIG. 2, at the opposing end of side members 32 is an adjusting pin 40 which hingedly connects mounting member 20 to the first end 41 of connecting member 24 at one of the openings 34. Adjusting pin 40 can interconnect opposing side members 32 through openings 34 to hingedly attach connecting member 24 to mounting member 20 and adjust the angle of connecting member 24 relative to the mounting 20 and locking 22 members. Located on plate 26 are one or more mounting holes 42 to facilitate connecting mounting member 20 to the frame or body of trailer 12. As is known in the art, alternate methods of mounting the mounting member 20 to trailer 12, such as welding or riveting can, alternatively, be utilized.

Figure 3:
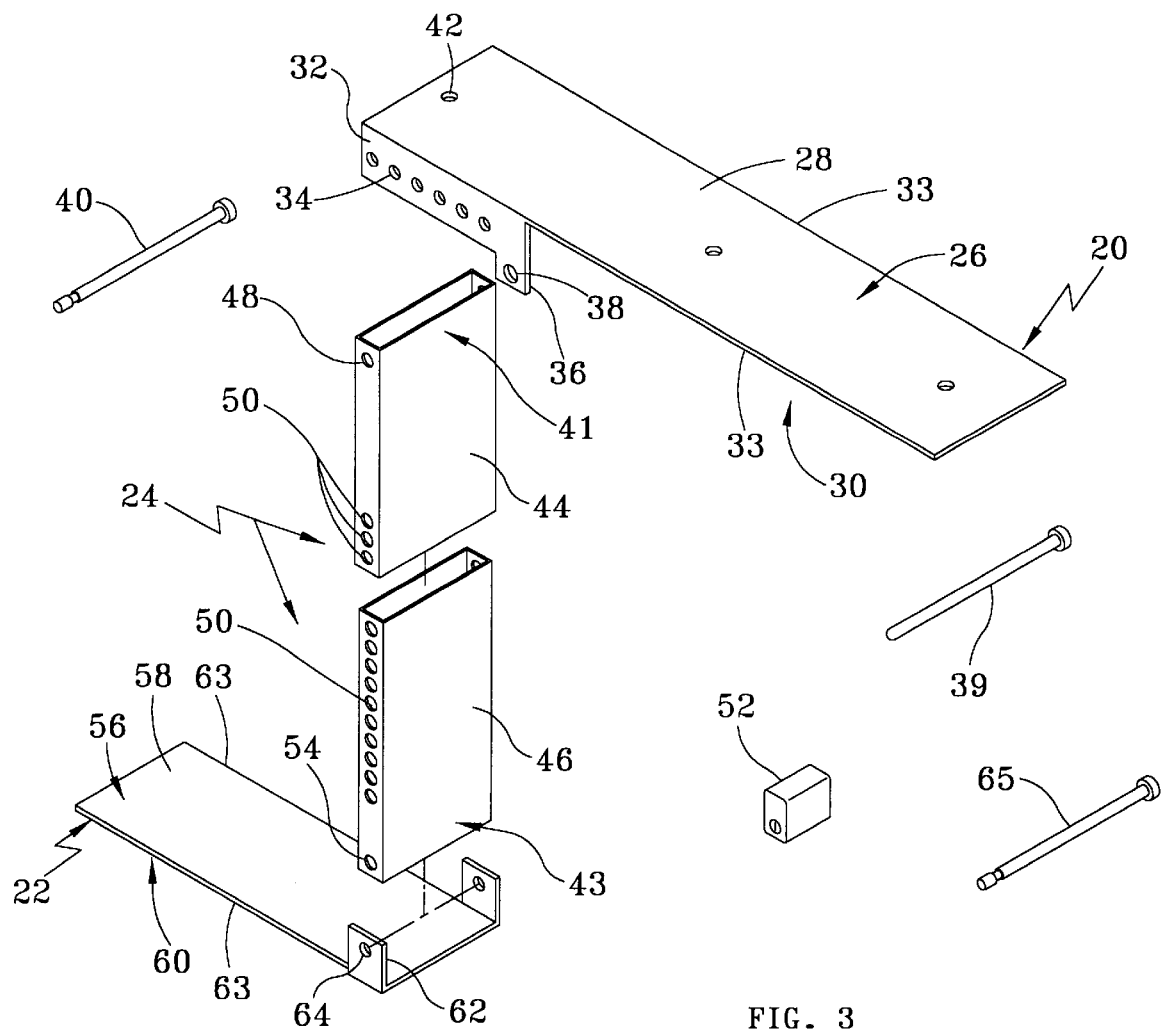
FIG. 3 is an exploded perspective view of the preferred embodiment of the present invention illustrated in FIG. 2.
Figure 4:
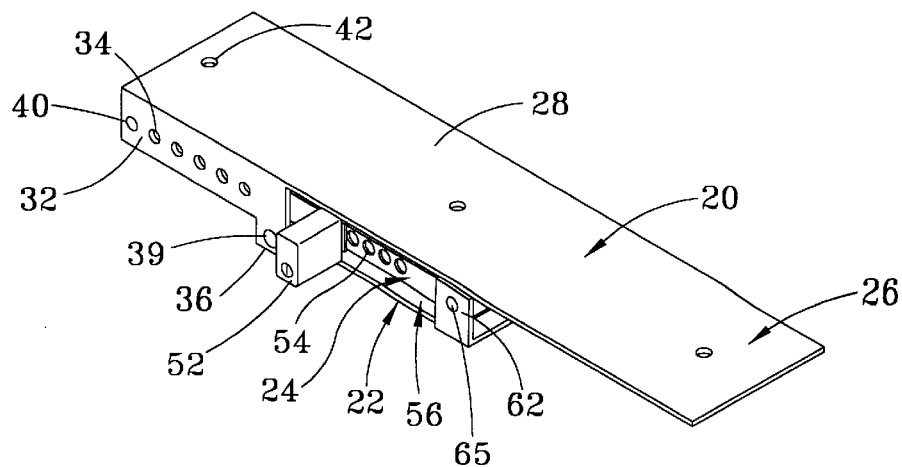
FIG. 4 is a perspective view illustrating the device of the present invention in a collapsed condition.

Connecting member 24 should be able to adjust in length, from the first end 41 to its second end 43, to allow device 10 to be adjustable for various trailer heights and configurations. In the preferred embodiment, as best shown in FIG. 3, connecting member 24 comprises a receiving component 44 and an insert component 46, which are sized and configured such that insert component 46 is slidably received into receiving component 44. At the first end 41 of connecting member 24, located at the end of receiving component 44 opposite insert component 46, is located a pair of hinge openings 48 to allow receiving component 44 to be hingedly attached to mounting member 20 at side members 32 using adjusting pin 40. Both receiving member 44 and insert member 46 have a plurality of opposing openings 50 in which locking mechanism 52 is received to connect receiving 44 and insert 46 components together. As shown in FIGS. 3 and 4, locking mechanism 52 can comprise a key lock device. Alternatively, locking device 52 can comprise any other suitable locking mechanism. At the second end 43 of connecting member 24, located at the end of insert member 46 opposite where it slides into receiving member 44, is located a pair of hinge openings 54 to facilitate hingedly connecting the connecting member 24 to locking member 22.

Locking member 22 comprises a generally flat plate 56 having a top surface 58, bottom surface 60 and a pair of upwardly extending members 62 at opposite sides 63 of flat plate 56. Each of the pair of upwardly extending members 62 has a hinge opening 64 suitable for fitting pin 65 to hingedly connect locking member 22 to insert member 46 of connecting member 24.

Figure 5:
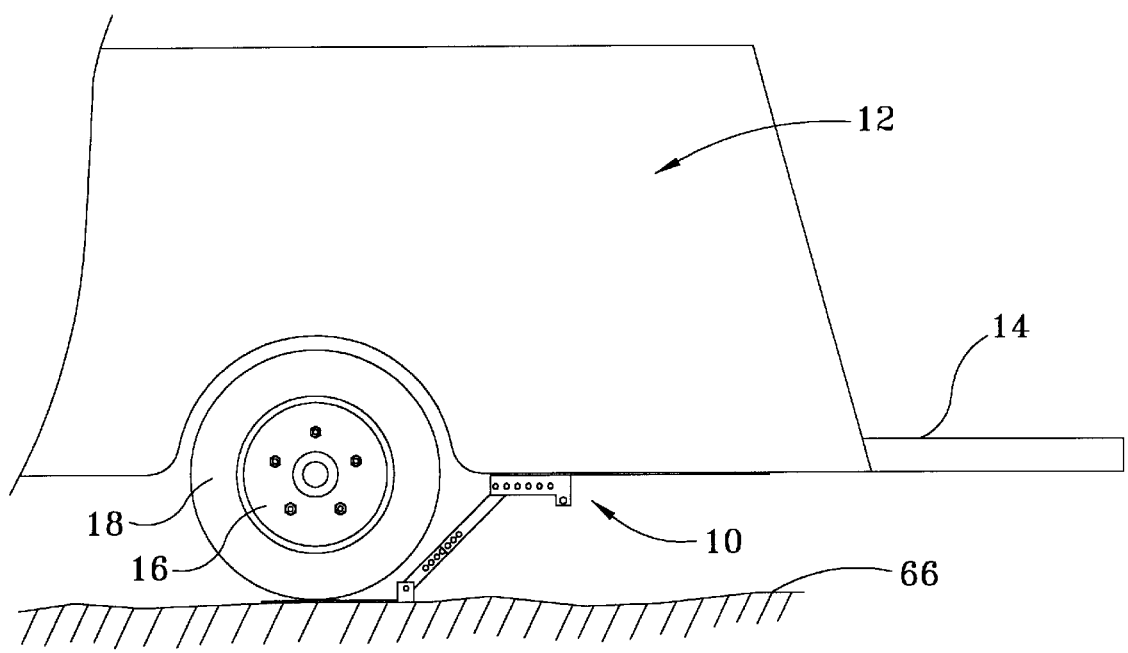
FIG. 5 is a side view of the present invention when in a locking configuration when mounted on a typical trailer.

When not in use, as shown in FIGS. 1 and 4 (such as when trailer 12 is being pulled behind a moving vehicle), device 10 folds up into a relative small, compact unit which is held in place by retaining pin 39. Pin 39 must be suitable for holding device 10 in the collapsed configuration, as shown in FIGS. 1 and 4, even when trailer 12 is subject to jarring and bumping as it moves down the road. When the trailer owner or operator wants to leave trailer 12 in a secured, locked condition, he or she merely pulls pin 39 to unfold device 10 and places it in the locking configuration as shown in FIG. 5. Bottom surface 60 of locking member 22 is placed against the ground surface 66 near tire 18. If not already set, the length of connecting member 24 is adjusted by sliding insert component 46 inside receiving component 48 and locking the two components in place with locking mechanism 52. Trailer 12 is then pulled or pushed such that tire 18 rolls on top of top surface 58 of locking member 22. As tire 18 rolls on top of locking member 22, as shown in FIG. 5, connecting member 24 is extended to its full, locked length.

Once set, trailer 12 is secured. Any thief who attempts to take trailer 12 by hooking up to tongue 14 will find that trailer 12 is virtually impossible to move. Because the wheel 18 that is locked with device 10 cannot rotate, trailer 12 will not be able to be moved in the normal manner, making theft of the trailer very difficult. The various components of device 10 should be manufactured of material that is difficult to cut or break, such as high strength steel or like materials, and the components must be configured such that they cannot be altered to disable device 10 and remove trailer 12 from its location.

In an embodiment found by the inventors to be suitable for most trailers, mounting member 20 comprises flat plate 26 approximately 26 inches long having side members 32 approximately 7½ inches long, locking member 22 comprises flat plate 56 approximately 14 inches long and connecting member 24 comprising receiving member 44 approximately 9 inches long by 1¼ inches deep and 5¼ inches wide and insert member 46 approximately 10¾ inches long by 1 inch deep and 4¾ inches wide. In the preferred embodiment, the various components were made of steel approximately ⅛" thick. Other metals, such as aluminum, and non-metals may be suitable for use and reduce the weight of device 10.

As an alternative embodiment, device 10 can be made with components that are sized and configured for a certain, specific type of trailer 12. In this embodiment, connecting member 24 could be fixedly and hingedly attached to mounting member 20 and locking member 22, and could be manufactured from a single piece of material, thereby eliminating the separate receiving 44 and insert 46 components.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A trailer wheel lock device adapted to be mounted on a vehicle substantially adjacent a wheel thereon, comprising:
   a mounting member for attachment to said vehicle;
   a substantially flat locking member;
   a connecting member having a first end and an opposing second end, said first end of said connecting member hingedly attached to said mounting member and said second end of said connecting member hingedly attached to said locking member so said device can go from a collapsed configuration to a locking configuration, said connecting member sized and configured such that said locking member can be placed under said wheel of said vehicle when said device is in said locking configuration; and
   angle adjusting means for adjusting the angle of said connecting member relative to said mounting member and said locking member, said angle adjusting means comprising a pair of opposing side members on said mounting member, a plurality of openings in each of said pair of opposing side members and an adjusting pin, said adjusting pin sized and configured to interconnect said pair of opposing side members and pivotally attach said connecting member to said mounting member.

2. The trailer wheel lock device according to claim 1, wherein said connecting member further comprises adjusting means for adjusting the length of said connecting member.

3. The trailer wheel lock device according to claim 2, wherein said connecting member further comprises locking means for locking said adjusting means to fix the length of said connecting member.

4. The trailer wheel lock device according to claim 2, wherein said adjusting means comprises a receiving component and an insert component, said insert component slidably received in said receiving component for adjusting the length of said connecting member.

5. The trailer wheel lock device according to claim 4, wherein said connecting member further comprises locking means for locking said receiving component and said insert component together to fix the length of said connecting member.

6. The trailer wheel lock device according to claim 1 further comprising retaining means for retaining said device in said collapsed condition.

7. The trailer wheel lock device according to claim 6, wherein said retaining means comprises a pair of opposing side members on said mounting member, said opposing side members having opposing pin openings for removably receiving a retaining pin, said retaining pin sized and configured to retain said locking member substantially against said connecting member and said mounting member.

8. A trailer wheel lock device adapted to be mounted on a vehicle substantially adjacent a wheel thereon, comprising:
   a mounting member for attachment to said vehicle;
   a substantially flat locking member;
   a connecting member having a first end, an opposing second end and adjusting means for adjusting the length of said connecting member, said first end of said connecting member hingedly attached to said mounting member and said second end of said connecting member hingedly attached to said locking member so said device can go from a collapsed configuration to a locking configuration, said connecting member sized and configured such that said locking member can be placed under said wheel of said vehicle when said device is in said locking configuration; and
   retaining means for retaining said device in said collapsed condition.

9. The trailer wheel lock device according to claim 8, wherein said connecting member further comprises locking means for locking said adjusting means to fix the length of said connecting member.

10. The trailer wheel lock device according to claim 8, wherein said adjusting means comprises a receiving component and an insert component, said insert component slidably received in said receiving component for adjusting the length of said connecting member.

11. The trailer wheel lock device according to claim 10, wherein said connecting member further comprises locking means for locking said receiving component and said insert component together to fix the length of said connecting member.

12. The trailer wheel lock device according to claim 8, wherein said retaining means comprises a pair of opposing side members on said mounting member, said opposing side members having opposing pin openings for removably receiving a retaining pin, said retaining pin sized and configured to retain said locking member substantially against said connecting member and said mounting member.

13. The trailer wheel lock device according to claim 8 further comprising angle adjusting means for adjusting the angle of said connecting member relative to said mounting member and said locking member.

14. The trailer wheel lock device according to claim 13, wherein said angle adjusting means comprises a pair of opposing side members on said mounting member, a plurality of openings in said side members and an adjusting pin, said adjusting pin sized and configured to interconnect said pair of opposing side members and pivotally attach said connecting member to said mounting member.

15. A trailer wheel lock device adapted to be mounted on a vehicle substantially adjacent a wheel thereon, comprising:

a mounting member for attachment to said vehicle;

a substantially flat locking member;

a connecting member having a first end, an opposing second end and adjusting means for adjusting the length of said connecting member, said first end of said connecting member hingedly attached to said mounting member and said second end of said connecting member hingedly attached to said locking member so said device can go from a collapsed configuration to a locking configuration, said connecting member sized and configured such that said locking member can be placed under said wheel of said vehicle when said device is in said locking configuration;

retaining means for retaining said device in said collapsed condition;

locking means for locking said adjusting means to fix the length of said connecting member; and angle adjusting means for adjusting the angle of said connecting member relative to said mounting member and said locking member.

16. The trailer wheel lock device according to claim 15, wherein said adjusting means comprises a receiving component and an insert component, said insert component slidably received in said receiving component for adjusting the length of said connecting member, said locking means for locking said receiving component and said insert component together to fix the length of said connecting member.

17. The trailer wheel lock device according to claim 15, wherein said retaining means comprises a pair of opposing side members on said mounting member, said opposing side members having opposing pin openings for removably receiving a retaining pin, said retaining pin sized and configured to retain said locking member substantially against said connecting member and said mounting member.

18. The trailer wheel lock device according to claim 15, wherein said angle adjusting means comprises a pair of opposing side members on said mounting member, a plurality of openings in said side members and an adjusting pin, said adjusting pin sized and configured to interconnect said pair of opposing side members and pivotally attach said connecting member to said mounting member.

\* \* \* \* \*